United States Patent [19]

Kawasaki et al.

[11] Patent Number: 5,453,330
[45] Date of Patent: Sep. 26, 1995

[54] AIR ELECTRODE BODIES FOR SOLID OXIDE FUEL CELLS, A PROCESS FOR THE PRODUCTION THEREOF, AND A PRODUCTION OF SOLID OXIDE FUEL CELLS

[75] Inventors: Shinji Kawasaki, Nagoya; Katsuki Yoshioka, Himeji, both of Japan

[73] Assignee: NGK Insulators, Ltd., Japan

[21] Appl. No.: 88,657

[22] Filed: Jul. 9, 1993

[51] Int. Cl.$^6$ ............................................. H01M 4/88
[52] U.S. Cl. ........................... 429/30; 429/40; 264/44; 264/104
[58] Field of Search ................... 429/30, 33, 40; 264/49, 66, 104

[56] References Cited

U.S. PATENT DOCUMENTS

| | | | |
|---|---|---|---|
| 3,549,423 | 12/1970 | Grubb et al. | 264/44 X |
| 3,845,181 | 10/1974 | Ravault | 264/44 |
| 5,106,706 | 4/1992 | Singh et al. | 429/33 X |
| 5,227,102 | 7/1993 | Yamada | 264/44 |
| 5,266,419 | 11/1993 | Yamada | 429/30 |

FOREIGN PATENT DOCUMENTS

| | | |
|---|---|---|
| 0395399 | 10/1990 | European Pat. Off. . |
| 0467590 | 1/1992 | European Pat. Off. . |
| 0469831 | 2/1992 | European Pat. Off. . |
| 0510820 | 10/1992 | European Pat. Off. . |
| 2-293384 | 12/1990 | Japan . |
| 3-017959 | 1/1991 | Japan ............. H01M/8/12 |
| 3-059953 | 3/1991 | Japan . |

OTHER PUBLICATIONS

Extended Abstracts, vol. 93, No. 1, 16 May 1993, Princeton, New Jersey, US, pp. 1673–1674 G. Stochniol et al., "Extended Investigations of the Reaction of Lay–xSrxMnO3 with YSZ".

Comm. Eur. Communities; Solid Oxide Fuel Cells 2–5 Jul. 1991, Greece—EUR 13564, pp. 673–680, H. Kaneko et al., "Reaction of La1–xCaxMnO3 Cathode with YSZ and its Influence on the Electrode Characteristics".

Patent Abstracts of Japan, vol. 16, No. 431 (C–983) 9 Sep. 1992 & JP–A–04 149 023 (Central Res Inst Of Electric Power Ind) 22 May 1992.

"A comprehensive engineering for energies", 13–2, 1990, pp. 52–68.

"Stability of Perovskite Oxide Electrode with Stabilized Zirconia", Yamamoto et al., Dept. of Chemistry, Faculty of Engineering, Mie University, 1989, pp.87–92.

Primary Examiner—Stephen Kalafut

[57] ABSTRACT

An air electrode body for a solid oxide fuel cell, which is composed of a perovskite-type structure having a chemical composition of $(La_{1-x}A_x)_{1-y}MnO_3$ wherein $0<x\leq0.5$, $0<y\leq0.2$, and A is at least one metal selected from strontium, calcium, manganese, barium, yttrium, cerium and ytterbium. The air electrode body has a porosity of 15 to 40% and an average pore diameter of 1–5 μm. A process for producing the air electrode body, includes the steps of: mixing lanthanum or a lanthanum compound, manganese or a manganese compound, a metal A or a compound of the metal A wherein A is at least one kind of metals selected from the group of strontium, calcium, manganese, barium, yttrium, cerium and ytterbium; calcining the resulting mixture at a temperature from 1,300° C. to 1600° C. to synthesize $(La_{1-x}A_x)_{1-y}MnO_3$; grinding the synthesized material to a powder having an average particle diameter of 3 to 15 μm; adding at least an organic binder, water and 2 to 12 parts by weight of a pore-forming agent to 100 parts by weight of the resulting powder and kneading the resulting mixture; molding the kneaded material; drying the molding; and then firing the molding at a temperature not higher than the calcining temperature.

13 Claims, 1 Drawing Sheet

AIR ELECTRODE BODIES FOR SOLID OXIDE FUEL CELLS, A PROCESS FOR THE PRODUCTION THEREOF, AND A PRODUCTION OF SOLID OXIDE FUEL CELLS

BACKGROUND OF THE INVENTION

1. Field of the Invention

The present invention relates to air electrode bodies for solid oxide fuel cells, a process for the production of the air electrode bodies, and a process for the production of the solid oxide fuel cells.

2. Related Art Statement:

Since the solid oxide fuel cells (SOFC) operate at high temperatures of 1,000° C. or more, electrode reaction is extremely active. Therefore, a noble catalyst metal catalyst such as precious platinum need not be used at all. Further, their polarization is small, and outputted voltage is relatively high. Thus, the energy-conversion efficiency is far greater as compared with other fuel cells. In addition, since the constituent parts of the solid oxide fuel cell are all solid, the solid oxide fuel cell is stable, and has a long-life.

At present, it is considered that zirconia is a most promising material for constituting a solid electrolyte film of the SOFC, and a lanthanum based perovskite-type composite oxide is promising as a material for the air electrode body (See Energy General Engineering 13-2, 1990).

However, it is reported that if a solid electrolyte film made of zirconia is formed on a surface of the lanthanum based perovskite-type composite oxide having a stoichiometrical composition, the zirconia reacts with perovskite composite oxide at around 1,200° C. to produce $La_2Zr_2O_7$ (See Proceedings of SOFC-NAGOYA 87–92, 1989). This fact means that when a laminated structure between an air electrode body and a solid electrolyte is to be formed, a high resistance layer made of $La_2Zr_2O_7$ is produced between the air electrode body and the solid electrolyte on heating at not less than 1,200° C., which largely reduce outputs from the cell.

As the structure of the SOFC unit cells, a self-supporting type structure is preferred, in which an air electrode body itself are used as a support and a solid electrolyte film and a fuel electrode film is formed thereon. As compared with a case in which an air electrode body film is formed on the surface of a porous ceramic support, the self-supporting type structure has the merit that the entire structure is simple, the producing process may be simplified, cost reduction is possible, and loss due to the gas-diffusing resistance is diminished to raise outputs from the unit cell. However, when the oxide electrolyte film is to be formed on the surface of the air electrode body, $La_2Zr_2O_7$ is formed at the interface.

SUMMARY OF THE INVENTION

It is an object of the present invention to prevent occurrence of a high resistance layer made of $La_2Zr_2O_7$ between the self-supporting air electrode body and the solid electrolyte film. In addition, the present invention is to provide a process for producing the self-supporting air electrode body, which process can afford sufficient porosity and pore diameters upon the air electrode body. Further, the present invention is to provide a process for producing solid oxide fuel cells with such air electrode bodies.

The present invention relates to an air electrode body for a solid oxide fuel cell, said air electrode body being composed of a perovskite-type structure having a chemical composition of $(La_{1-x}A_x)_{1-y}MnO_3$ wherein $0<x\leq0.5$, $0<y\leq0.2$, and A is at least one metal selected from the group consisting of strontium, calcium, manganese, barium, yttrium, cerium and ytterbium, wherein said air electrode body has a porosity of 15 to 40% and an average pore diameter of 1–5 μm.

The present invention further relates to a process for producing an air electrode body for a solid oxide fuel cell, comprising the steps of: mixing lanthanum or a lanthanum compound, manganese or a manganese compound, and a metal A or a compound of the metal A wherein A is at least one metal selected from the group consisting of strontium, calcium, magnesium, barium, yttrium, cerium and ytterbium; calcining the resulting mixture at a temperature from 1300° C. to 1600° C. to synthesize $(La_{1-x}A_x)_{1-y}MnO_3$ in which $0<x\leq0.5$ and $0<y\leq0.2$; grinding the synthesized material to a powder having an average particle diameter of 3 to 15 μm; adding at least an organic binder, water and 2 to 12 parts by weight of a pore-forming agent to 100 parts by weight of the ground powder and kneading the resulting mixture; molding the kneaded material; drying the molding; and firing the molding at a temperature not higher than a calcining temperature.

In this process, it is preferable that when lanthanum or the lanthanum compound, manganese or the manganese compound, the metal A or the compound of the metal A are mixed, mixing ratios are so set as to give La:Mn:A=(1−x)(1−ky): 1: x(1−ky) in terms of molar ratio in which $1.2\leq k\leq 1.8$, and said $(La_{1-x}A_x)_{1-y}MnO_3$ is synthesized by calcining the resulting mixture at a temperature of 1,300° to 1,600° C.

The present invention further relates to a process for producing a solid oxide fuel cell, comprising the steps of:

(1) preparing an air electrode body by mixing lanthanum or a lanthanum compound, manganese or a manganese compound, and a metal A or a compound of the metal A wherein A is at least one kind of metals selected from the group consisting of strontium, calcium, magnesium, barium, yttrium, cerium and ytterbium; calcining the resulting mixture at a temperature from 1300° C. to 1600° C. to synthesize $(La_{1-x}A_x)_{1-y}MnO_3$ in which $0<x\leq0.5$ and $0<y\leq0.2$; grinding the synthesized material to a powder having average particle diameter of 3 to 15 μm; adding at least an organic binder, water and 2 to 12 parts by weight of a pore-forming agent to 100 parts by weight of the resulting powder and kneading the resulting mixture; molding the kneaded material; drying the molding; and then firing the molding at a temperature not higher than the calcining temperature;

(2) forming a constituent element other than the air electrode body, including heat treatment of the constituent element at a temperature lower then the temperature at which the air electrode body is fired.

In the above composition of $(La_{1-x}A_x)_{1-y}MnO_3$, La and the metal A occupy so-called A-sites in the perovskite-type structure, and Mn occupies B-sites therein. The limitation of $0<y\leq0.2$ means that there are defects in the A-sites. That is, the composition ratio of La and A occupying the A-sites is stoichiometrically insufficient, and in turn the composition ratio of Mn is greater than that in the stoichiometrical composition.

The phrase "a constituent element or constituent elements" means a solid electrolyte film, a fuel electrode film, an interconnector and so on.

These and other objects, features and advantages of the invention will be appreciated upon reading of the following description of the invention when taken in conjunction with the attached drawing, with the understanding that some modifications, variations and changes of the same could be easily made by the skilled person in the art to which the invention pertains without departing from the spirit of the invention or the scope of the attached claims.

BRIEF DESCRIPTION OF THE DRAWING

The invention will be explained with reference to the attached drawing, wherein.

DETAILED DESCRIPTION OF THE INVENTION

Figure 1:
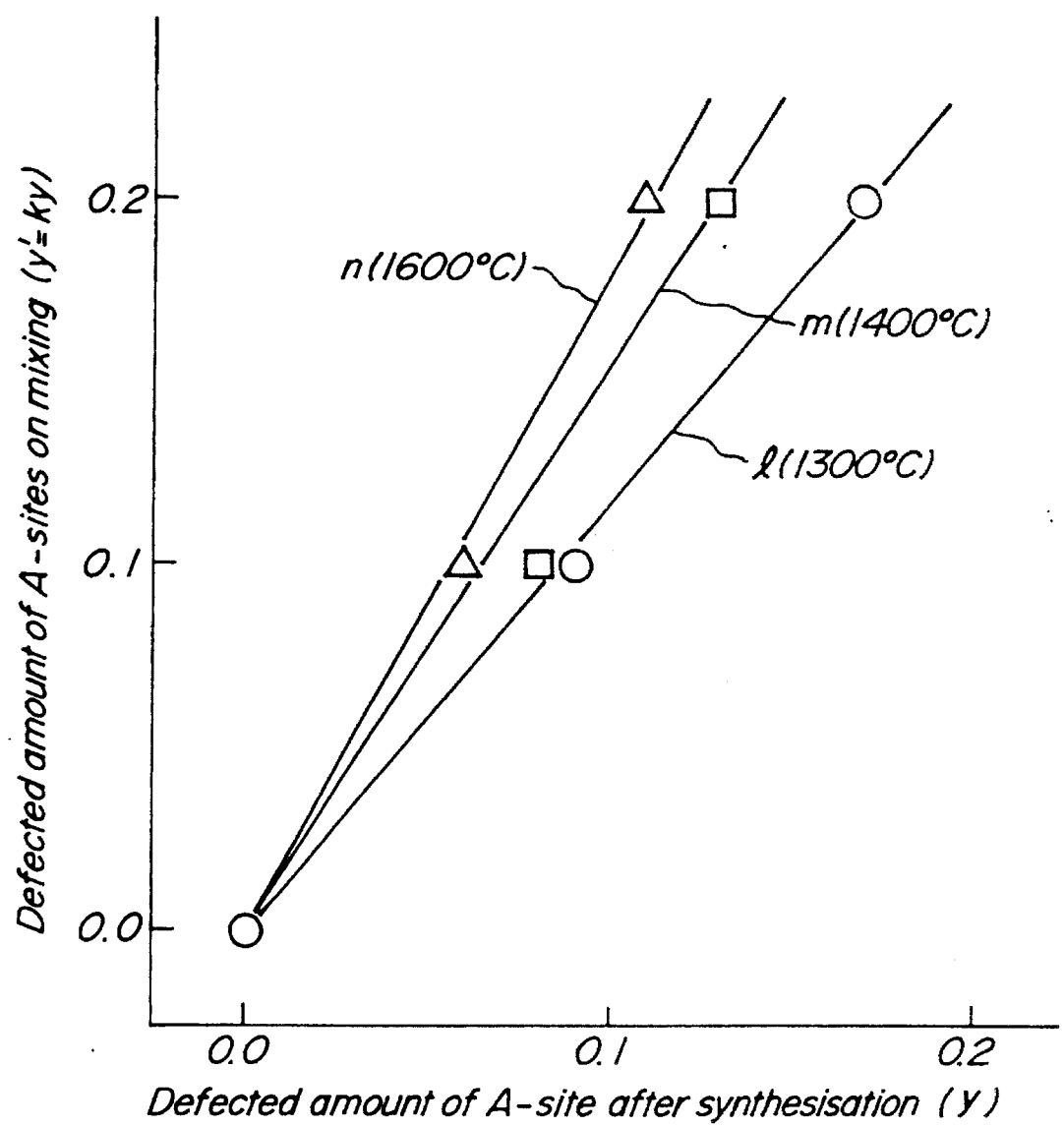
FIG. 1 is a graph showing the relationship between a defected amount (y') of A-sites of a starting raw material powder on mixing and a defected amount of the A-sites of the synthesized material.

The air electrode body of the present invention is made of lanthanum manganite having the perovskite structure in which the A-sites partially lack. Even when a solid electrolyte film composed mainly of zirconia is formed on the surface of this air electrode body and the air electrode body and the solid electrolyte film are fired at not less than 1,200° C., a high resistant layer made of $La_2Zr_2O_7$ is not formed at the interface between the air electrode body and the solid electrolyte film even by heating at not less than 1,200° C.

In the present invention, however, there is possibility that a slight amount of a high resistant compound such as $La_2Zr_2O_7$ is produced at the interface between the air electrode body and the solid electrolyte film as viewed microscopically. However, such a high resistant compound is not produced continuously in a stratum form when absorbed by a reflection electron image sectional photograph with a scanning type electron microscope.

Since the high resistant layer composed of a compound containing lanthanum and zirconium can be removed, high resistance and reduction in output of the SOFC element (unit cell) due to the high resistance layer can be avoided.

The reason why such effects can be obtained is not clear. However, it is considered that since the A-sites in which lanthanum element is located stoichiometrically lack, no excess $La_2O_3$ is produced even when manganese is diffused so that reaction with $ZrO_2$ is suppressed. Further, it is considered that as compared with the perovskite structure having the composition of $La_{1-x}A_xMnO_3$, the crystal lattice becomes smaller so that diffusion of lanthanum is suppressed.

Furthermore, since the air electrode body of the present invention has the porosity of not less than 15% and the average pore diameter of not less than 1 μm, the gas-diffusing resistance can be sufficiently reduced. In addition, since the porosity is reduced to not more than 40% and the average pore diameter is decreased to not more than 5 μm, sufficiently large strength can be afforded upon the air electrode body as a substrate of the unit cell of the self-supporting type. The porosity of the air electrode body is preferably 25 to 35%. The average pore diameter of the air electrode body is preferably 1 to 3 μm.

If the value of y exceeds 0.2, $Mn_3O_4$ crystals precipitate besides the perovskite phase, so that the electric conductivity of the air electrode body decreases. Further, if the y value is reduced to not more than 0.1, the above-mentioned effects of the present invention become extremely conspicuous and the electric conductivity of the air electrode body is high.

Thus, it is more preferable that the value of y is not more than 0.1.

If the value of x is more than 0.5, the amount of substituting elements becomes so great that the electroconductivity of the air electrode body decreases. In this sense, $0.1 \leq x \leq 0.3$ is preferred.

The present inventors have investigated in detail the process for producing the air electrode bodies mentioned above, and discovered the following difficult problems.

That is, NGK Insulators, Ltd. proposed in Japanese patent application Laid-open No. 2-293,384 a process for producing the air electrode body tubes made of lanthanum manganite having a stoichiometric composition. However, it was made clear that if this process is applied to the air electrode body of the present invention as it is, sintering extremely proceeds during firing the air electrode body or during the post heat treatment of products possessing the air electrode body, so that the intended porosity of the intended average pore diameter cannot be realized. The present inventors have developed the process for producing the air electrode body having the desired porosity and the desired average pore diameter from the A-site partially lacked lanthanum manganite easy to be sintered. This process will be explained in order.

First, La or a La compound, Mn or a Mn compound, and a metal A or a compound of the metal A are mixed, which is calcined at a temperature of 1,300° to 1,600° C. to synthesize $(La_{1-x}A_x)_{1-y}MnO_3$. The lower limit of the calcining temperature must be set at 1,300° C., because if $(La_{1-x}A_x)_{1-y}<MnO_3$ synthesized at a lower temperature is used, sintering proceeds too greatly during firing the ground, kneaded and shaped product. In this sense, it is preferable that the calcining temperature is set at not less than 1,400° C. On the other hand, the reason why the upper limit of the calcining temperature is set at 1,600° C. is that sufficient thermal resistance can be afforded upon the synthesizate when the calcinating temperature is set at not more than 1,600° C., that high temperatures more than 1,600° C. are difficult to realize in the case of the general furnace, and that such high temperatures are unnecessary in view of the objects intended in the present invention.

Next, a powder having the average particle size of 3 to 15 μm is obtained by grinding the above synthesized material. The finer the ground powder, the more uniform can the distribution of the pores in the air electrode body be maintained, and ultimately the strength of the air electrode body can be increased. However, if the average particle diameter is set less than 3 μm, the air electrode body has a low porosity, i.e., the desired porosity (not less than 15%) cannot be obtained. On the other hand, if the above particle diameter is more than 15 μm, the strength of the air electrode body decreases.

Then, at least an organic binder, water and 2 to 12 parts by weight of a pore-forming agent are added to 100 parts by weight of the thus obtained powder, which is kneaded. As the pore-forming agent, acryl powder, carbon powder or the like is preferred. If the addition amount of the powder is less than 2 parts by weight, the resulting air electrode body is highly densified, so that the intended porosity (not less than 15%) cannot be realized. On the other hand, if the addition amount of the pore-forming agent is more than 12 parts by weight, the distribution of the pores in the air electrode body becomes non-uniform and mechanical strength of the electrode decreased. The addition amount of the pore-forming agent is preferably 2 to 7 parts by weight.

Next, the kneaded material is molded, and the resulting molding is dried, calcined, and fired at a temperature lower than the calcining temperature, thereby producing an air electrode body.

That is, the present inventors newly found out that if the firing temperature of the air electrode body is higher than the preceding calcining temperature, sintering of the air electrode body rapidly exceeds beyond expectation, so that the porosity of the air electrode body becomes smaller. In order to prevent the excess sintering progression of the synthesized powder, it was discovered that the firing temperature of the air electrode body must be made lower than the calcining temperature.

Next, when a constituent element or constituent elements of the SOFC other than the air electrode body are to be formed, the heating temperature of the constituting element or elements is made lower than the firing temperature of the air electrode body.

That is, it was discovered that the air electrode body is likely to be densified during the heat treatment, and therefore, if the constituting element is fired at a temperature higher than the firing temperature of the air electrode body, the porosity of the air electrode body rapidly decreases. In order to prevent resintering like this, the heat treatment temperature of the constituent element must be made lower than the firing temperature of the air electrode body.

As one embodiment of the present invention, a solid electrolyte film is formed on the surface of the air electrode body by thermal spraying, and then a gastight solid electrolyte film can be formed by heat treatment. This heat treatment may be effected either prior to or posterior to the formation of a fuel electrode film. As a raw material for spraying, a mixture or a solid solution of a compound (particularly an oxide) of an alkaline earth metal or a rare earth element and zirconia is preferred.

As compared with the EVD as a conventional process for producing the dense thin solid electrolyte, the process for the formation of the solid electrolyte film by thermal spraying in this manner is more technically simple, and cost is lower in that the film can be formed only by using an ordinary thermal spraying device, an ordinary electric furnace for heat treatment and so on.

In addition, when the thermally sprayed solid electrolyte film is heated, fine cracks, defects, stratum defects inherently possessed by the films formed by the conventional plasma spraying can be diminished, and the closed pores inside the film can be made spherical or near spherical. By so doing, the electroconductivity of the solid electrolyte film can be made equivalent to that of a sintered one thereof, and leakage of the gas through the solid electrolyte film can be prevented.

In the present invention, the air electrode body is used as a substrate of the self-supporting type SOFC. For this reason, it is preferable that the thickness of the air electrode body is made not less than 0.5 mm to increase the strength thereof.

The shape of the air electrode body may be a tubular shape with opposite ends opened, a substantially tubular shape with one end opened, a planar shape, etc.

The chemical composition of the perovskite structure constituting the air electrode body is $(La_{1-x}A_x)_{1-y}MnO_3$. Since the amount of the oxygen in this composition is difficult to be finely measured by the current measuring technology, some deviation of the measured oxygen is accepted in the present invention.

Specific examples of the present invention will be described below.

Experiment 1

$La_2O_3$ powder, $Mn_3O_4$ powder, and $SrCO_3$ were prepared as starting materials. Among them, the $La_2O_3$ powder was roasted preliminarily at 900° C. in air for 3 hours. These powders were so measured that La:Sr:Mn might be 7.2:1.8:10 in terms of molar ratio, and then wet mixed, dried and ground. An organic binder (polyvinyl alcohol) was added to the ground powder, which was molded by extrusion in a form of a columnar shaped body having a diameter of 60 mm and a height of 200 mm. The thus shaped columnar bodies were calcined in air for 12 hours, at respective temperatures shown in Table 1. It was confirmed through observation of each calcined product with the X-ray diffraction process that they were of the perovskite phase. As mentioned in Example 2 mentioned below, the perovskite structure having a chemical composition in which A-sites partially lacked can be synthesized.

Next, each of the calcined materials was ground in a ball mill until the powder having the average particle diameter of 5 to 7 μm was obtained. To 100 parts by weight of the thus obtained powdery raw material were added 6 parts by weight of cellulose as a pore-forming agent, 2 parts by weight of polyvinyl alcohol as a binder and 18 parts by weight of water, which was kneaded. The kneaded material was molded by extrusion to obtain an opposite end-opened tubular molding having an outer diameter of 20 mm, a length of 100 mm and a thickness of 2 mm. Then, the tubular molding was dried with moisture being controlled, and fired in air for 4 hours, at a firing temperature shown in Table 1. The porosity of each of the thus produced air electrode body tubes was measured by the water-replacing method, and results are shown in Table 1.

Thereafter, each of the air electrode body tubes was subjected to heat treatment in air for 3 hours, at a temperature given in Table 1. This heat treatment was effected to simulate heat which would be received by the air electrode body during the formation of the solid electrolyte film on the surface of the air electrode body tube. In this Experiment, the heat treatment was effected at 1,300° C. to 1,500° C., assuming a case where an yttria-stabilized zirconia film would be formed on the surface of the air electrode body tube by plasma spraying and then the plasma-sprayed film would be densified by heat treatment. After the heat treatment, the porosity of each of the air electrode body tubes was measured by the water-replacing process. Results are shown in Table 1.

TABLE 1

| | Calcining temp. (°C.) | Firing temp. (°C.) | Porosity of air electrode tube (%) | Heating temp. (°C.) | Porosity after heat treatment (%) |
|---|---|---|---|---|---|
| Comparative Example 1-1 | 1300 | 1200 | 37.8 | 1300 | 19.2 |
| Example 1-1 | 1300 | 1300 | 35.9 | 1300 | 34.2 |
| Comparative Example 1-2 | 1300 | 1300 | | 1500 | 2.1 |
| Comparative Example 1-3 | 1300 | 1600 | 0.9 | 1300 | 0.8 |
| Comparative Example 1-4 | 1300 | 1600 | | 1500 | 0.8 |
| Example 1-2 | 1400 | 1300 | 37.1 | 1300 | 36.6 |
| Comparative Example 1-5 | 1400 | 1300 | | 1500 | 5.8 |

TABLE 1-continued

|  | Calcining temp. (°C.) | Firing temp. (°C.) | Porosity of air electrode tube (%) | Heating temp. (°C.) | Porosity after heat treatment (%) |
|---|---|---|---|---|---|
| Example 1-3 | 1400 | 1400 | 33.5 | 1300 | 32.0 |
| Comparative Example 1-6 | 1400 | 1400 |  | 1500 | 16.1 |
| Comparative Example 1-7 | 1400 | 1600 | 2.1 | 1300 | 2.3 |
| Comparative Example 1-8 | 1400 | 1600 |  | 1500 | 1.9 |
| Example 1-4 | 1600 | 1300 | 38.5 | 1300 | 38.0 |
| Comparative Example 1-9 | 1600 | 1300 |  | 1500 | 13.9 |
| Example 1-5 | 1600 | 1600 | 31.5 | 1300 | 31.2 |
| Example 1-6 | 1600 | 1600 |  | 1500 | 30.9 |

Examples 1-1 through 1-5 satisfied the other requirements of the present invention.

When variations of the porosity of the fired products prior to and posterior to the heat treatment are accepted considering the accuracy of the porosity-measuring process, Examples 1-1, 1-2, 1-3, 1-4, 1-5 and 1-6 meet the requirements of the present invention.

In Comparative Examples 1-1, 1-2, 1-5, 1-6 and 1-9, sintering of the air electrode body tubes greatly progressed during the heat treatment, and changes in the porosity between prior to and posterior to the heat treatment are too large. In Comparative Examples 1-3, 1-4, 1-7 and 1-8, the air electrode body tubes were too densified during firing them, and the synthesized $(La_{1-x}A_x)_{1-y}MnO_3$ powder became likely to be sintered. It is clear from Table 1 that in order to prevent such easy sintering, the calcining temperature must be made higher than the firing temperature.

Experiment 2

Since a new knowledge was obtained during the course of the synthesis of $(La_{1-x}A_x)_{1-y}MnO_3$, further investigations were made with respect to synthesis experiments based on this knowledge.

First, an $La_2O_3$ powder, an $Mn_3O_4$ powder and an $SrCO_3$ powder were prepared. Among them, a $La_2O_3$ powder was preliminarily roasted at 900° C. in air for 3 hours. These powders were so measured that mixed ratios of La:Mn:Sr might be $(1-x'):1:x'(1-y')$. Values of $x'$ and $y'$ are shown in Table 2. The above mixed ratios would have given lanthanum manganite having the following expression: $(La_{1-x'}A_{x'})_{1-y'}MnO_3$.

The above powders were wet mixed, dried and ground. To the thus obtained powder was added an organic binder (polyvinyl aocohol), and then the powder was molded by extrusion to obtain a columnar body having a diameter of 60 mm and a height of 200 mm. Thus obtained columnar bodies were calcined in air for 12 hours, at respective temperatures shown in Table 2, thereby obtaining synthesized materials. Each synthesized material was ground to the average particle diameter of not more than 5 μm in a ball mill. Further, each synthesized powder was ground in a crucible, and the composition was analyzed by emission spectroscopic analysis. Results are shown in Table 2. Values x and y in Table 2 are those in the following expression: $(La_{1-x}A_x)_{1-y}MnO_3$.

TABLE 2

| When formulated | | Calcining temp. | When synthesized | |
|---|---|---|---|---|
| x' | y' | (°C.) | x | y |
| 0.20 | 0.00 | 1300 | 0.20 | 0.00 |
|  |  | 1400 | 0.20 | 0.00 |
|  |  | 1600 | 0.20 | 0.00 |
| 0.20 | 0.10 | 1300 | 0.20 | 0.09 |
|  |  | 1400 | 0.20 | 0.08 |
|  |  | 1600 | 0.20 | 0.06 |
| 0.20 | 0.20 | 1300 | 0.20 | 0.17 |
|  |  | 1400 | 0.20 | 0.13 |
|  |  | 1600 | 0.20 | 0.11 |

In Table 2, when $y'=0.00$, i.e., the composition is stoichiometric, the composition ratios at the mixing time is coincident with that in the chemical composition of the synthesized product.

However, it was found that when the A-sites partially lacked, the y value decreased with respect to the value y', and the lacked amount of the A-sites changed from a presumed value. This is considered that Mn was likely to be evaporated on calcining due to lacking of the A-sites.

In order to clarify the changes in the composition, the relationship between the lacked amount (y') of the A-sites on mixing and the lacked amount (y) of the A-sites after the synthesis is shown by the graph in FIG. 1. The graphs when the calcining temperatures were at 1,300° C., 1,400° C. or 1,600° C. can be approximated by straight lines l, m and n, respectively. The relationship between y and y' is correlated by $y=ky'$.

It is seen that when the calcining temperature becomes higher, the value k increases. There is the following relationship between the calcining temperature and the value k.

| Calcining temperature | k |
|---|---|
| 1,300° C. | 1.2 |
| 1,400° C. | 1.5 |
| 1,600° C. | 1.8 |

From the above results, if the mixed powder is calcined in a temperature range from 1,300° C. to 1,600° C., the mixed powder needs to be formulated to preliminarily suppress the addition amounts of La and the metal A so that k may be in a range from $1.2 \leq k \leq 1.8$.

As mentioned above, if the air electrode body of the present invention is used, a high resistance layer made of such as $La_2Zr_2O_7$ will not be produced at the interface between the air electrode body and the solid electrolyte film.

Further, according to the producing process of the present invention, sufficient porosity and average pore diameter can be afforded upon the air electrode body as desired, so that the air electrode body can be favorably produced.

What is claimed is:

1. An air electrode body for a solid oxide fuel cell, said air electrode body being constituted by a perovskite structure having a chemical composition of $(La_{1-x}A_x)_{1-y}MnO_3$, wherein $0<x\leq0.5$, $0<y\leq0.2$, and A is at least one metal selected from the group consisting of strontium, calcium, magnesium, barium, yttrium, cerium and ytterbium, said air electrode body having a porosity of 15 to 40% and an average pore diameter of 1–5 μm.

2. The air electrode body as set forth in claim 1, wherein the porosity and the average pore diameter of the air electrode body are 25–35% and 1–3 μm, respectively.

3. The air electrode body as set forth in claim 1, wherein $0.1 \leq x \leq 0.3$ and $0 < y \leq 0.1$.

4. The air electrode body as set forth in claim 1, which has a thickness of not less than 0.5 mm.

5. A process for producing an air electrode body for a solid oxide fuel cell, said process comprising the steps of:

mixing lanthanum or a lanthanum compound, manganese or a manganese compound, and a metal A or a compound of the metal A, wherein A is at least one metal selected from the group consisting of strontium, calcium, magnesium, barium, yttrium, cerium and ytterbium;

calcining the resulting mixture at a temperature of from 1300° C. to 1600° C. to synthesize $(La_{1-x}A_x)_{1-y}MnO_3$ in which $0 < x \leq 0.5$ and $0 < y \leq 0.2$;

grinding the synthesized material to a powder having an average particle diameter of 3 to 15 μm;

adding at least an organic binder, water and 2 to 12 parts by weight of a pore-forming agent to 100 parts by weight of the ground powder and kneading the resulting mixture;

molding the kneaded material;

drying the molding; and firing the molding at a temperature not higher than a calcining temperature thereof.

6. The process according to claim 5, wherein when lanthanum or the lanthanum compound, manganese or the manganese compound, the metal A or the compound of the metal A are mixed, mixing ratios are so set as to give La:Mn:A=(1−x)(1−ky):1:x(1−ky) in terms of molar ratio in which $1.2 \leq k \leq 1.8$, and said $(La_{1-x}A_x)_{1-y}MnO_3$ is synthesized by calcining the resulting mixture at a temperature of 1,300° to 1,600° C.

7. The process as set forth in claim 5, wherein said calcining temperature is 1,400° C. to 1,600° C.

8. The process as set forth in claim 5, wherein an addition amount of the pore-forming agent is 2 to 7 parts by weight relative to 100 parts by weight of the ground powder.

9. A process for producing a solid oxide fuel cell, comprising the steps of:

(1) preparing an air electrode body by mixing lanthanum or a lanthanum compound, manganese or a manganese compound, and a metal A or a compound of the metal A, wherein A is at least one metal, selected from the group consisting of strontium, calcium, magnesium, barium, yttrium, cerium and ytterbium;

calcining the resulting mixture at a temperature of from 1300° C. to 1600° C. to synthesize $(La_{1-x}A_x)_{1-y}MnO_3$ in which $0 < x \leq 0.5$ and $0 < y \leq 0.2$;

grinding the synthesized material to a power having an average particle diameter of 3 to 15 μm;

adding at least an organic binder, water and 2 to 12 parts by weight of a pore-forming agent to 100 parts by weight of the resulting powder and kneading the resulting mixture;

molding the kneaded material;

drying the molding; and firing the molding at a temperature not higher than a calcining temperature thereof;

(2) forming a constituent element other than said air electrode body, including heat treatment of said constituent element at a temperature lower than the temperature at which the air electrode body is fired.

10. The process according to claim 9, wherein when lanthanum or the lanthanum compound, manganese or the manganese compound, the metal A or the compound of the metal A are mixed, mixing ratios are so set as to give La:Mn:A=(1−x) (1−ky):1:x(1−ky) in terms of molar ratio in which $1.2 \leq k \leq 1.8$, and said $(La_{1-x}A_x)_{1-y}MnO_3$ is synthesized by calcining the resulting mixture at a temperature of 1,300° to 1,600° C.

11. The process as set forth in claim 9, wherein said calcining temperature is 1,400° to 1,600° C.

12. The process as set forth in claim 9, wherein an addition amount of the pore-forming agent is 2 to 7 parts by weight relative to 100 parts by weight of the ground powder.

13. The air electrode body as set forth in claim 1, wherein said air electrode body is self-supporting.

* * * * *